Feb. 4, 1969  R. W. EVANS  3,425,535
CURVED RUBBER BRICKS

Filed March 8, 1967  Sheet _1_ of 2

INVENTOR.
ROBLEY W. EVANS
BY
*Marshall & Yeasting*
ATTORNEYS

Feb. 4, 1969   R. W. EVANS   3,425,535
CURVED RUBBER BRICKS

Filed March 8, 1967

INVENTOR.
ROBLEY W. EVANS

BY *Marshall & Yeasting*

ATTORNEYS

United States Patent Office 3,425,535
Patented Feb. 4, 1969

3,425,535
CURVED RUBBER BRICKS
Robley W. Evans, New Albany, Ind., assignor to Rex Chainbelt Inc., Milwaukee, Wis., a corporation of Wisconsin
Filed Mar. 8, 1967, Ser. No. 621,546
U.S. Cl. 198—220            7 Claims
Int. Cl. B65g 27/00

ABSTRACT OF THE DISCLOSURE

This invention relates to an arrangement of rubber springs in a vibratory apparatus to secure an improvement in the ratio of spring rate to damping losses. In this arrangement rubber springs that resiliently couple portions of the apparatus to form a vibratory system are compressed between sections of cylindrical surfaces, chords of which are parallel to the path of vibration of relative motion of the portions. In the direction of desired vibration the rubber is stressed principally in shear and partly in compression.

Background of the invention

This invention relates to rubber springs used as coupling elements in a two mass vibratory work performing system, and in particular to a mounting arrangement providing a large storage of vibratory energy per unit volume in the rubber spring with relatively low damping losses.

Rubber springs have been used in various types of vibratory apparatus both as isolation springs to minimize transmission of vibratory force to adjacent structures and as coupling springs to couple relatively moving parts of a vibratory apparatus. When used as coupling springs the rubber is usually stressed in shear to provide a long stroke with relatively constant spring rate. The rubber may also be used in compression, with a much smaller energy storage per unit volume of spring and a substantial increase in spring rate.

Summary of the invention

According to the invention the rubber springs are arranged in the form of curved rubber bricks, oriented such that a chord of the curve of the brick is generally parallel to the path of maximum relative motion between the members connected by the rubber springs. The springs are preferably used in pairs and are compressed in a direction normal to the said path of relative motion. In this orientation the springs are stressed principally in shear with the end portions of the blocks, the ends of the curves, also having a component of stress in compression produced by the relative movement of the members. This configuration of the rubber springs, as compared with the same springs in a flat form, provides an increase in spring rate of thirty or more percent with little or no observable change in internal damping losses in the springs. This configuration takes advantage of the substantially uniform stress throughout the rubber, characteristic of rubber stressed in shear, and, additionally, adds the rate increasing factor of stress in compression in a limited volume of the spring where there is no great concentration of stress.

Description of the drawings

A vibratory feeder embodying the invention is illustrated in the accompanying drawings.

In the drawings.

Figure 1:
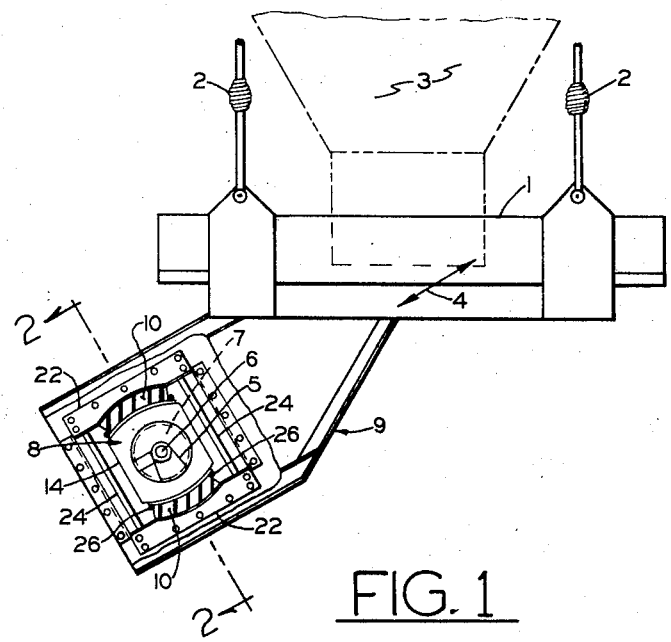
FIGURE 1 is a side elevation, with parts broken away, of a vibratory feeder employing curved rubber springs coupling an exciter member to a work member of the feeder.

These specific figures and the accompanying description are intended merely to illustrate the invention and not to impose limitations on its scope.

Description of the preferred embodiment

The invention is particularly useful in apparatus in which a vibratory feeder trough or work member is driven by an exciter coupled to the trough by means of coupling springs to form a tuned resonant system. In such a system a trough 1 is supported on a plurality of vibration isolating springs 2 in position to receive material from a hopper 3. Only two of the four springs 2 ordinarily employed to support the hopper are shown in the drawing.

The trough is vibrated generally along a path indicated by an arrow 4 by vibratory forces produced by eccentric weights 5 carried on a shaft 6 of a motor 7 forming part of an exciter mass 8. The exciter mass 8 is supported by and coupled to a drive frame 9, shown as extending downwardly and rearwardly from the trough 1, by means of rubber coupling springs 10 that are stressed principally in shear and partly in compression.

In this structure the spring rate of the rubber springs 10 is preferably selected so that the natural frequency of the system comprising the exciter mass 8, including the motor 7, and the work member or trough 1, including the drive frame 9, is resonant at a frequency approximately 10 percent higher than the operating speed of the motor 7. In this arrangement, because of resonance effects, the centrifugal force of the eccentric weights 5 produces substantial motion along the path 4 and relatively small motion transverse to that path.

Figure 2:
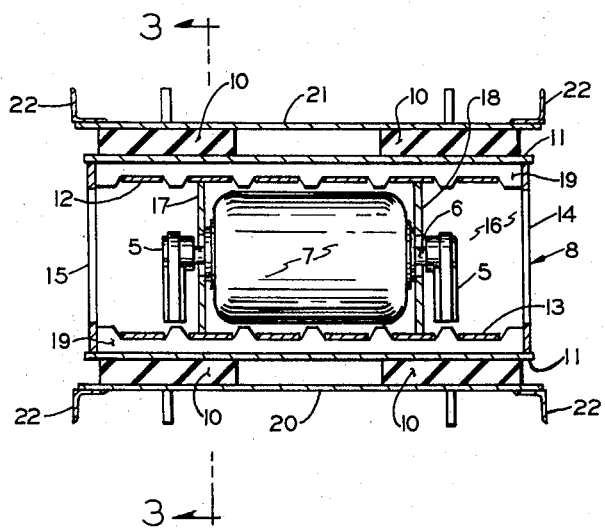
FIGURE 2 is a section along the line 2—2 of FIGURE 1.
Figure 3:
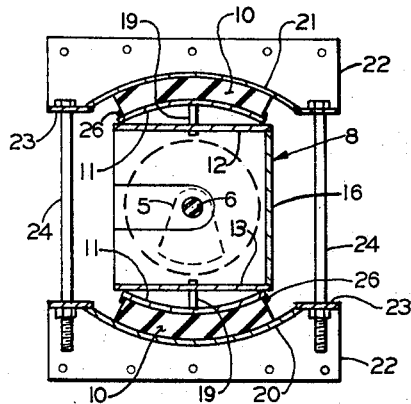
FIGURE 3 is a section taken along the line 3—3 of FIGURE 2.

Referring now to FIGURES 2 and 3, the exciter housing 8 includes spring seats 11 that are attached to the top and bottom of the housing 8. The housing 8 itself comprises a box-like structure consisting of a flat top plate 12, a bottom plate 13, end plates 14 and 15, and a back plate 16. In addition, it includes a pair of partitions 17 and 18 that support the motor 7. The partitions 17 and 18 are slotted to accommodate the motor shaft 6 so that the motor may be installed or removed without disassembly of the exciter itself. The spring seats 11 are convex in form and, along their center lines, are supported on ribs 19 extending from the top and bottom plates 12 and 13 and along their straight sides are securely welded to the marginal areas of the top and bottom plates 12 and 13. The spring seats 11 are preferably sections of cylindrical surfaces the axes of which are parallel to the motor shaft but not necessarily coaxial therewith. Preferably the radius of the cylindrical surface forming the spring seat is greater than the distance from the spring seat to the motor shaft.

The rubber springs 10 are coupled to the trough or work member by cooperating concave spring seats 20 and 21 provided on their curved ends with flanges 22 adapted to be securely bolted to side members of the drive frame 9. Furthermore, each of the spring seats along its straight edge is provided with a flange 23 which is connected through clamp bolts 24 to the similar flange of the other spring seat.

This structure may be assembled prior to being installed in the drive frame 9 by positioning the lower spring seat 20, in a horizontal position and locating the lower ones of the rubber springs 10 in position thereon with the springs along the length of the concave cylindrical surface and centered between the flanges 23. The exciter member 8 is then placed on the rubber springs 10 with its lower spring seat 11 centered on the rubber blocks. Next the upper rubber springs are positioned on the upper spring seat 11 and the top concave spring seat 21 placed in position. The bolts 24 are then installed and tightened until the rubber springs have been compressed approximately 10 percent. This assembly is then placed in the drive frame 9 and the end flanges 22 of the concave spring seats are securely bolted to the drive frame 9, in this arrangement the rubber springs are not bonded to the spring seats but rather are held by compression pressure. To prevent creepage of the springs each of the convex spring seats 11 is provided along its straight side with a locating rod 26 that are welded to the spring seats in positions to lightly engage the ends of the rubber springs positioned on the spring seats. Similar rods, not shown, may be located on the convex and concave sides of the spring seats along the sides of the rubber blocks to prevent them from creeping laterally, i.e. along the direction of the motor shaft. Locating rods similar to the rods 26 are not needed on the concave spring seats 20 and 21 since any tendency of a rubber spring to creep to the left or right as seen in FIGURE 3 results in further compression of the leading edge of the spring and generation of a force tending to return the spring to its original position.

Figure 4:
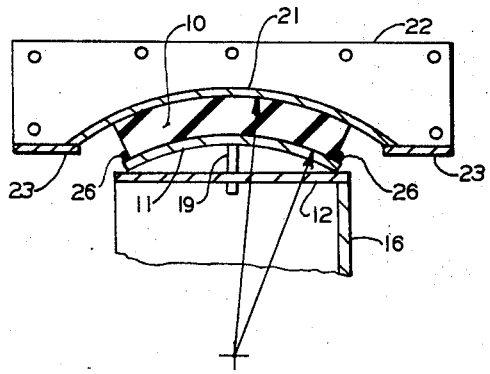
FIGURE 4 is a side elevation of one of the rubber springs and cooperating spring seats shown at midstroke of the relative movement between the parts.
Figure 5:
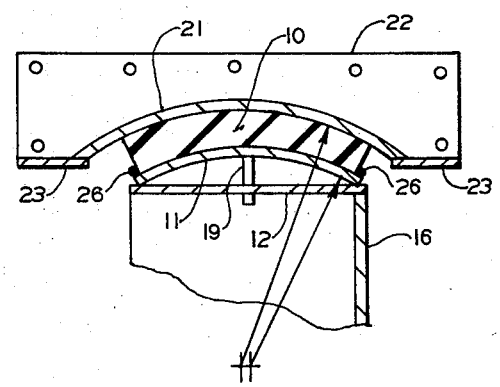
FIGURE 5 is a side elevation similar to FIGURE 4 showing the spring in its deflected position, as at the end of the relative vibratory movement between the parts.

FIGURE 4 shows one of the springs 10 and the cooperating spring seats at the midpoint of the vibratory motion and FIGURE 5 shows the spring at one end of the vibratory stroke. In the midstroke or unstressed position, FIGURE 4, the spring 10 is compressed between the spring seats 11 and 21 but there is no force tending to move one of the spring seats laterally with respect to the other. During vibration, when the exciter 8 moves relative to the drive frame 9 along the direction of the arrow 4, the exciter spring seats 11, 12 move laterally with respect to the opposing concave spring seats 20 so that the rubber springs 10 are stressed principally in shear. When the exciter 8 is deflected to the right relative to the drive frame 9, as shown in FIGURE 5, right hand end portion of the rubber spring is compressed as well as stressed in shear because of the inclination of the spring seats relative to the path of vibration or movement. At the same time the left hand end of the spring is allowed to expand somewhat. The amount of expansion is not as great as the initial compression effected by the clamp bolts 24 so that the rubber is never completely relieved of compression stress.

One of the desirable characteristics of springs used in vibratory apparatus, particularly in resonant systems such as just described, is low frictional losses. When a resonant system is used to, in effect, multiply the forces exerted by the eccentric weights to produce motion of the exciter member and of the work member the forces transmitted through the coupling springs are much larger than the actual forces produced by the eccentric weights. If the springs are subject to loss not only is a substantial portion of the available energy from the eccentric weights lost in the springs but this loss results in heat generated in the springs. When this occurs in rubber springs the rubber, particularly in the interior of the spring, may reach a sufficiently high temperature to cause deterioration of the rubber.

In addition to being relatively loss free the springs, for this type of service, should also have a substantially uniform spring rate throughout their full range of deflection in order that the natural frequency of the system shall remain substantially constant with changes in amplitude of vibration. It is a known characteristic of rubber springs that when the springs are stressed in compression the spring rate tends to increase with the magnitude of the deflection, i.e. the springs get stiffer as the deflection increases. It is also known that the spring rate of rubber springs that are stressed in shear, particularly when subjected to transverse compression, tends to decrease with increase ni deflection at least through a portion of the range of deflection. The illustrated arrangement of the springs in which the central portion of each spring is stressed in shear and in which the end portions are stressed both in shear and in compression provides not only an increased spring rate as compared to a similar sized rubber spring stressed only in shear but also provides a spring rate that remains substantially constant with deflection.

Experimental evidence indicates that in this arrangement, in which the springs are curved so as to stress the end portions both in shear and compression, a substantial increase in spring rate, in the order of 30 percent or more may be secured with no apparent increase in friction losses or hysteresis in the springs themselves.

In the preferred form the spring seats are each portions of right cylindrical surfaces the chords of which are parallel and remain parallel as the exciter member vibrates relative to the frame and work member. These chords extend parallel to the path 4. While the cylindrical form is preferable, similar results can be obtained by forming the spring seats as sections of ellipses or as sections of polygons since the only requirement is that the major portion of the rubber i.e. central portions of the springs be stressed in shear and that the end portions be stressed both in shear and in compression.

I claim:
1. In a vibratory work performing system comprising a work member adapted to perform work by vibration, and resilient means coupling the work member to an exciter to form a resonant vibratory system, in combination, at least one spring bearing seat on said work member having a shape that approximates a portion of a cylindircal surface the axis of which portion is normal to and the chord of which portion is generally parallel to the path of vibration of the work member, a spring bearing seat on said exciter that approximates a portion of a generally cylindrical surface opposed to said work member spring bearing seat, said surfaces being generally concentric, and a block of elastic material constituting said resilient coupling means compressed between said spring seats whereby a portion of said elastic material is stressed in shear and other portions are stressed in shear and compression by relative vibratory movement of said members along said path.

2. An apparatus according to claim 1 having two spring bearing seats on the work member and on the exciter member, said seats being arranged symmetrically with respect to the path of vibration to form a clamp to compress the elastic material normal to the path of vibration.

3. An apparatus according to claim 2 in which the axis of each cylindrical surface lies between the axis and surface of the other cylindrical surface.

4. An apparatus according to claim 1 in which said exciter journals a shaft carrying an eccentric weight.

5. An apparatus according to claim 1 in which each spring bearing seat is a portion of a right circular cylinder.

6. An apparatus according to claim 1 in which each spring bearing seat is a portion of a polygon.

7. An apparatus according to claim 1 in which each spring bearing seat is a portion of an ellipse.

References Cited

UNITED STATES PATENTS 3,203,264  8/1965  Evans _____ 74—61

FOREIGN PATENTS 890,750  3/1962  Great Britain.

RICHARD E. AEGERTER, *Primary Examiner.*